Jan. 8, 1935.     D. G. ROOS     1,987,269
MOTOR VEHICLE
Filed Feb. 21, 1934     2 Sheets-Sheet 1

INVENTOR.
Delmar G. Roos
BY
P. M. Pomeroy
ATTORNEYS.

Jan. 8, 1935.  D. G. ROOS  1,987,269
MOTOR VEHICLE
Filed Feb. 21, 1934  2 Sheets—Sheet 2
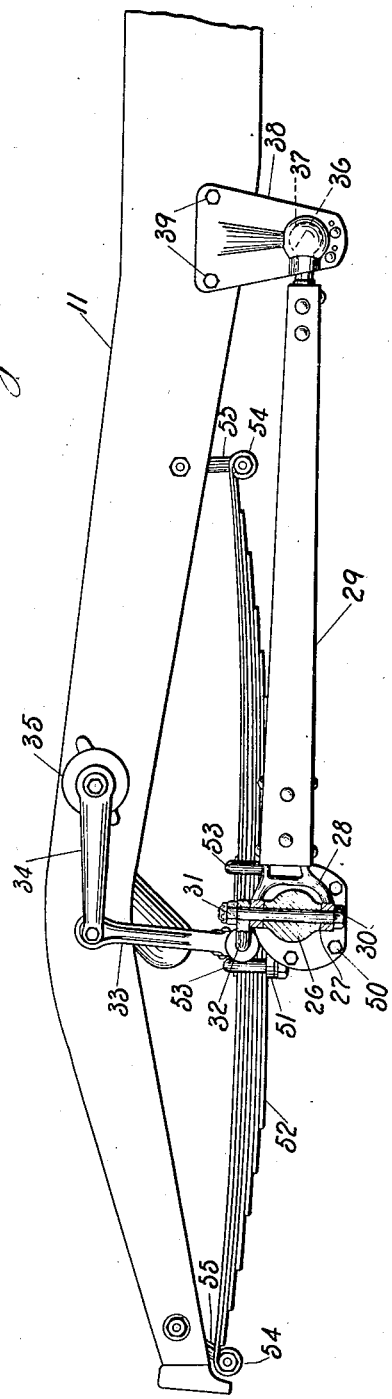
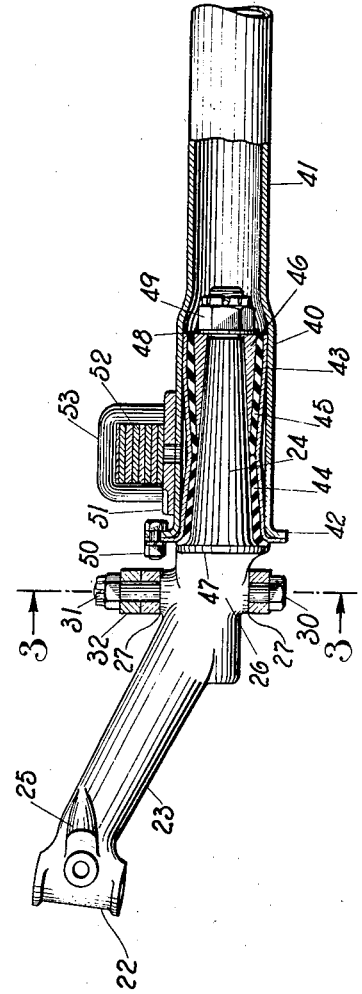
INVENTOR.
Delmar G. Roos
BY
ATTORNEYS.

Patented Jan. 8, 1935

1,987,269

UNITED STATES PATENT OFFICE 1,987,269

MOTOR VEHICLE

Delmar G. Roos, South Bend, Ind., assignor to The Studebaker Corporation, Detroit, Mich., a corporation of New Jersey Application February 21, 1934, Serial No. 712,363

8 Claims. (Cl. 280—124)

This invention relates to motor vehicles of the type having independently sprung road wheels and particularly to such vehicles in which the front wheels thereof are independently and vertically yieldable in relation to the frame supported thereon.

The principal object of my invention is to provide supporting means for the front road wheels which will permit either wheel to rise and fall above and below a normal load level under the action of the springs in a vertical manner and without tilting the other wheel.

A further object is to provide positive and effective means for the location of the wheel during its vertical travel relative to the frame and for resisting the various loads of reaction set up between the wheel and the vehicle under operating conditions.

Another object is to provide a resilient member interposed between each front wheel support and the front axle which will absorb torsional resistance set up when either wheel rises or falls from the normal road level.

Another object is to provide independently mounted wheels each of which are mounted on a spindle suitably connected with a torsion arm hingedly connected with the frame to prevent fore and aft movement of the wheels relative to the frame, each of the wheel spindles having ends extending into a tubular front axle and having a rubber bushing interposed between each wheel spindle and the axle adapted to prevent torsional reaction from either of the wheels when raised or lowered from the normal road level from being transmitted to or through the axle to the other wheel.

The above being among the objects of the present invention, the same consists of certain details of manufacture and construction as will be apparent from the drawings and the detailed description to follow.

While the drawings show one suitable embodiment of my invention, the same are for the purpose of illustration only and not as limiting the scope of the invention, the scope of which is to be measured entirely by the scope of the subjoined claims.

In the drawings in which like numerals refer to like parts throughout the several views, Fig. 1 is a diagrammatic plan view of a motor vehicle including my invention.

Fig. 3 is a sectional view taken on the lines 3—3 of Figs. 1 and 2.

Fig. 4 is a sectional view taken on the lines 4—4 of Fig. 2.

Figure 1:
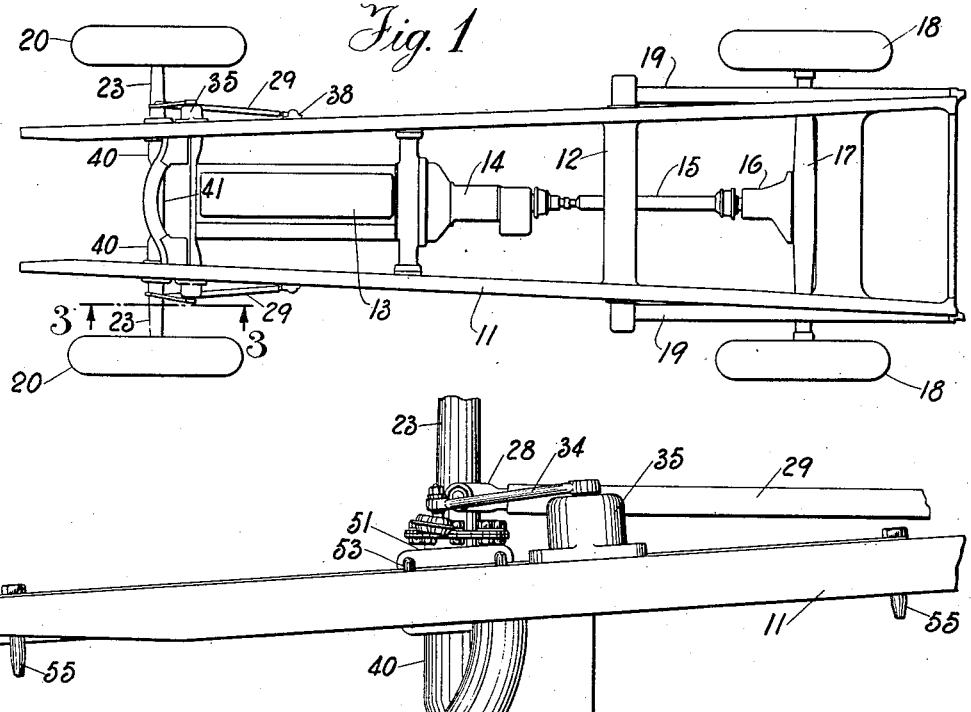
Figure 2:
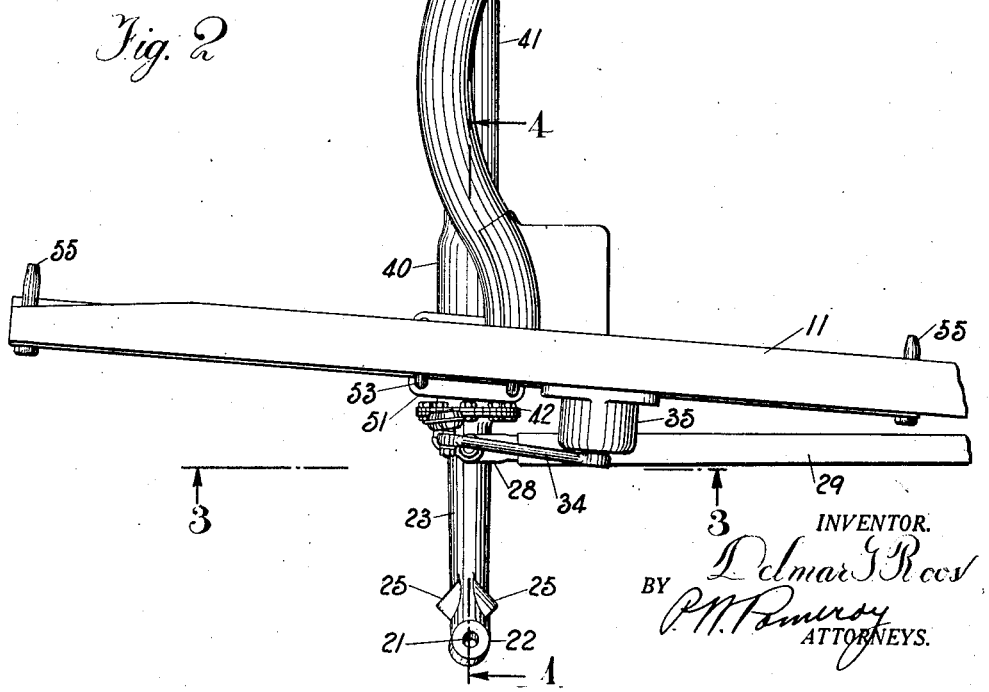
Fig. 2 is an enlarged fragmentary plan view, showing the wheel mounting but with the wheels removed.

While I am aware that several methods of independently mounting the wheels on a motor vehicle have been heretofore used, in the present invention I employ radius rods which are hingedly connected with the frame and the respective wheels, the rods being mounted to prevent longitudinal movement of the wheels relative to the vehicle and which absorb the shocks due to braking loads and rough road, thus relieving the springs of those forces which have been heretofore imposed on them so that the springs are now used only for supporting the vertical loads. In such a construction it has been found necessary to provide means to relieve the torsional strain put upon the vehicle due to the raising or lowering of one of the wheels relative to the frame and I have also provided such means for accomplishing that purpose.

To enable others to better understand my invention, I have illustrated a motor vehicle having a frame comprising side rails 11 and cross members 12 and power-transmitting means comprising an engine 13, a transmission 14, and a propellor shaft 15 extending from the transmission 14 to the differential 16 which is suitably connected with the rear axle 17 for driving the rear road wheels 18. The frame is supported at the rear by suitable springs 19. As the parts heretofore described form no part of my invention, except the frame which will hereinafter be mentioned more in detail, I will not describe these parts further as it is well recognized by those skilled in the art that the units shown or other suitable units may be substituted therefor without in any way affecting the mounting of the front wheels presently to be described.

Each of the front wheels 20 is mounted on wheel spindles each having a king pin (not shown) adapted to be mounted in the opening 21 formed in the end 22 of the arm 23 which terminates in a spindle 24, as is clearly shown in Fig. 4. Each arm 23 has stops 25 formed on the opposite edges thereof to limit the turning movement of the wheels 20 relative to the vehicle. Each arm also has an enlarged portion 26 having flat faces 27 at the top and bottom thereof adapted to receive the forward yoke end 28 of the radius rod 29 pivotally connected to the arm 23 by the pivot pin 30 extending through the yoke and the opening 21 and held in position by the nut 31. The pin 30 is preferably somewhat longer than the yoke 28 to receive the arm 32 connected with the link 33 pivotally connected with the arm 34 extending from the shock absorber 35 which is preferably rigidly mounted on the outer side face of the side frame member 11. The rear end of the radius rod 29 has a ball 36 formed thereon carried in a suitable socket 37 formed in the bracket 38 which is attached to the frame side member 11 by the bolts 39. It will be seen from the above description that with the radius rod 29 pivotally connected to the frame 11 by the ball and socket joint and having its forward end hingedly connected with the wheel carrying arm 23, as the wheel moves up and down from the normal road level, the same is constrained to travel in an arc former by the radius generated from the axis of the ball 36 in the socket 37. The radius rods 29 thus provide means to maintain the wheels in proper relation longitudinally of the vehicle and take the strains and stresses thus imposed on the wheels in that direction. Also the radius arms take up or counteract the brake torque reaction imposed upon the front wheels when four wheel brakes are employed.

The spindles 24 formed on the arms 23 extend into the extruded ends 40 of the tubular hollow front axle 41 which have flanges 42 thereon, as shown in Fig. 4. Inserted within the ends 40 is a relatively thin casing 43 which may be tubular but which is preferably of Venturi shape inside of which are mounted rubber rings or bushings 44 and 45. Interposed between the rubber rings 45 and the spindle 24 is a sleeve 46 which preferably is wedge-shaped in cross section, the assembly being held against movement toward the axle by a flange 47 formed at the large end of the spindle 24 and by the washer 48 and the nut 49 screw-threaded on the outer end thereof to the axle 24 to prevent movement of the arm outwardly from the axle. To maintain the assembly in position, I clamp the flange 42 formed on the axle end 40 and the flanged end of the sleeve 43 together by the bolts 50, as is clearly shown in Fig. 4.

It has been found desirable in assembling the several units that the rubber bushings be either vulcanized to the outer sleeve 43 or that the bushing 45 be vulcanized to the sleeve 48 and the bushing 44 to the spindle 24. In practice, the rubber bushing 44 is preferably vulcanized to the outer sleeve 43 and the rubber bushing 45 is vulcanized to the inner sleeve 46, thus permitting the forming of the rubber bushings to the proper dimension before inserting the spindle 24 therethrough. It is also to be preferred that when the parts are assembled, the rubber bushings 44 and 45 be held under compression between the spindle 24 and the front axle end 40. Spring pads 51 are formed on the ends 40 of the axle 41 to support the spring leaves 52 substantially midway between the ends thereof, the same being held in clamped position thereon by the U-bolt 53. The outer ends of the top leaf of the spring are formed into eyes 54 to provide connections with the shackles 55 which are also pivotally attached at the spring side members 11. As shown, each front spring is carried by the front axle intermediate its end and each end of the spring is connected by shackles to the frame side member instead of having one end of the spring directly connected to the frame as in conventional constructions.

It will be seen that as the radius rods 29 prevent fore and aft movement of the wheels relative to the vehicle and as the radius rods take up any brake reaction imposed upon the wheels, the springs 52 are provided merely for supporting the vertical load imposed upon the vehicle and are not required to absorb or take up the torsional strains which are imposed upon the springs and wheel mountings now in common use.

As either of the wheels rises or falls from its normal position, considerable torsional stresses would be transmitted therefrom to the front axle were it not for the rubber bushings which absorb such torsional reactions by permitting relative twisting movements of the arm 23 relative to axle 41, or vice versa, so that any of the torsional stresses imposed upon either one of the road wheels is not carried through to the front axle and hence to the other wheel. Also, it will be observed that because of the ball and socket connection of the radius rod with the frame, as either one of the wheels rises or falls, the torque reaction is not transmitted by the radius rod 29 to the frame due to the universal mounting at the rear end of the radius rod. As either of the wheels rises or falls on an arc described about the axis of the ball 36, there is a slight rotational movement of the spindle 24 relative to the axle 41 which is absorbed by the resistance of the rubber bushings 44 and 45 so that the torsional resistance between the spindle 24 and the axle 41 is absorbed by these rubber members. It will also be observed that the sleeve 46, the rubber bushings 44 and 45, and the outer sleeve 43 may be assembled on the spindle 24 before the same is mounted in the axle and also that the nut 49 on the spindle 24 may be threaded down to provide the prescribed compression on the bushings 44 and 45.

While I have shown one suitable embodiment of my invention, it will be understood that various modifications can be made therein by those skilled in the art without departing from the spirit and substance of my invention and that I desire to claim the same broadly as well as specifically as is indicated in the appended claims.

What I claim is:

1. In a motor vehicle, a wheel supporting arm, an axle enclosing an end of said arm, a frame, a spring secured to said axle pivotally attached at its end to said frame to support the latter, and means maintaining under compression interposed between said end of said arm and axle to permit torsional movement therebetween.

2. In a motor vehicle, a wheel supporting arm, an axle enclosing an end of said arm, a frame, a spring secured to said axle pivotally attached at its end to said frame to support the latter, and a rubber bushing interposed between said end of said arm and axle to permit torsional movement therebetween.

3. In a motor vehicle, a wheel supporting arm having a spindle formed thereon, an axle having a tubular end extending over said spindle, and a rubber bushing held under compression interposed between said spindle and axle end to permit torsional movement therebetween.

4. In a motor vehicle, a wheel supporting arm having a spindle formed thereon, an axle having a tubular end surrounding said spindle, a casing within said axle end, a rubber bushing vulcanized to said casing surrounding said spindle, means for maintaining said bushing under compression between said casing and spindle, said bushing permitting torsional movement between said axle and spindle, and means connecting said casing and axle to prevent end-wise movement of said spindle relative to said axle.

5. In a motor vehicle, a wheel supporting arm having a spindle formed thereon, a frame, a radius rod attached at its opposite ends to said arm and frame to cause said arm to travel in a predetermined path relative to said frame and to take up any torque and brake reactions imposed upon said arm, an axle telescoping said spindle, and a rubber bushing interposed between said spindle and axle to permit torsional movement therebetween.

6. In a motor vehicle, a wheel supporting arm having a spindle formed thereon, a frame, a radius rod hingedly connected at one end with said arm and having a universal connection at its opposite end with said frame, an axle telescoping said spindle, a spring secured intermediate its end to said axle and pivotally attached at its ends to said frame to support the latter, and a rubber bushing under compression interposed between said spindle and axle to permit torsional movement therebetween.

7. In a motor vehicle, a frame, a wheel supporting arm constrained to move in a radial path to said frame, an axle having a tubular end telescoping the inner end of said arm, a spring secured to said axle and pivotally attached to said frame to support the latter, a rubber bushing maintained under compression interposed between the inner end of said arm and said tubular end of said axle to permit torsional movement therebetween, and means to prevent end-wise movement of said arm relative to said axle.

8. In a motor vehicle, a wheel supporting arm having a spindle formed thereon, a frame, means attached to said arm and frame to constrain said arm to move in a radial path relative to said frame, an axle telescoping said spindle, a spring secured to said axle intermediate its ends and pivotally attached at its end to said frame to support the latter, a casing within said axle, a rubber bushing maintained under compression interposed between said casing and spindle to permit relative torsional movement between said arm and axle, and means to rigidly attach said casing to said axle.

DELMAR G. ROOS.